(12) United States Patent
Kim et al.

(10) Patent No.: US 11,548,992 B2
(45) Date of Patent: *Jan. 10, 2023

(54) ANTIREFLECTION FILM

(71) Applicant: LG CHEM, LTD., Seoul (KR)

(72) Inventors: Boo Kyung Kim, Daejeon (KR); Yeong Rae Chang, Daejeon (KR); Seok Hoon Jang, Daejeon (KR); Jin Seok Byun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/205,735

(22) Filed: Mar. 18, 2021

(65) Prior Publication Data

US 2021/0206936 A1    Jul. 8, 2021

Related U.S. Application Data

(63) Continuation of application No. 15/747,368, filed as application No. PCT/KR2016/015340 on Dec. 27, 2016, now abandoned.

(30) Foreign Application Priority Data

Jan. 7, 2016 (KR) .................. 10-2016-0002242

(51) Int. Cl.
| | |
|---|---|
| C08J 7/048 | (2020.01) |
| B32B 27/08 | (2006.01) |
| C09D 7/65 | (2018.01) |
| B32B 27/36 | (2006.01) |
| C09D 5/00 | (2006.01) |
| C08K 3/36 | (2006.01) |
| C09D 4/00 | (2006.01) |
| C09D 7/63 | (2018.01) |
| C08K 7/26 | (2006.01) |
| C08J 7/043 | (2020.01) |
| C08J 7/044 | (2020.01) |
| C08J 7/046 | (2020.01) |
| C08J 7/04 | (2020.01) |
| G02B 1/111 | (2015.01) |

(52) U.S. Cl.
CPC .............. *C08J 7/048* (2020.01); *B32B 27/08* (2013.01); *B32B 27/36* (2013.01); *C08J 7/042* (2013.01); *C08J 7/043* (2020.01); *C08J 7/044* (2020.01); *C08J 7/046* (2020.01); *C08K 3/36* (2013.01); *C08K 7/26* (2013.01); *C09D 4/00* (2013.01); *C09D 5/00* (2013.01); *C09D 5/006* (2013.01); *C09D 7/63* (2018.01); *C09D 7/65* (2018.01); *G02B 1/111* (2013.01); *C08J 2367/00* (2013.01); *C08J 2367/02* (2013.01); *C08J 2435/02* (2013.01); *C08J 2483/04* (2013.01)

(58) Field of Classification Search
CPC ............ C08J 7/042; C08J 7/043; C08J 7/044; C08J 7/046; C08J 2367/00; C08J 2435/02; C08K 3/36; C08K 7/26; C09D 4/00; C09D 5/00; C09D 5/006; C09D 7/63; G02B 1/111
See application file for complete search history.

(56) References Cited

U.S. PATENT DOCUMENTS

| | | | |
|---|---|---|---|
| 8,506,853 B2 | 8/2013 | Wada et al. | |
| 9,297,933 B2 | 3/2016 | Kuroda et al. | |
| 9,383,494 B2 | 7/2016 | Shin et al. | |
| 9,817,167 B2 | 11/2017 | Shin et al. | |
| 2007/0185298 A1 | 8/2007 | Baikerikar et al. | |
| 2009/0202802 A1* | 8/2009 | Seong | G02B 1/111 |
| | | | 524/588 |
| 2010/0021694 A1 | 1/2010 | Wakizaka et al. | |
| 2010/0092895 A1 | 4/2010 | Zhang et al. | |
| 2010/0246014 A1 | 9/2010 | Asahi et al. | |
| 2011/0075261 A1 | 3/2011 | Fukuda et al. | |
| 2011/0089385 A1 | 4/2011 | Wada et al. | |
| 2012/0003437 A1* | 1/2012 | Wada | G03F 7/325 |
| | | | 430/325 |
| 2013/0100378 A1 | 4/2013 | Murata et al. | |

(Continued)

FOREIGN PATENT DOCUMENTS

| | | |
|---|---|---|
| JP | 2001-207115 A | 7/2001 |
| JP | 2006047504 A | 2/2006 |

(Continued)

OTHER PUBLICATIONS

Translation of KR2013 0058223, Kim et al., corresponding KR 2014 0140139 published Dec. 9, 2014 (Year: 2014).*

(Continued)

*Primary Examiner* — Hai Vo
(74) *Attorney, Agent, or Firm* — Rothwell, Figg, Ernst & Manbeck. P.C.

(57) ABSTRACT

The present invention relates to an antireflection film. The antireflection film includes a low refractive index layer having excellent alkali resistance and exhibiting remarkably improved mechanical properties such as scratch resistance and impact resistance as well as reduction of a glare phenomenon, and a base film exhibiting excellent mechanical strength and water resistance in spite of a thin thickness and having no fear of interference fringes occurring. Therefore, such antireflection film can be used as a protective film of a polarizing plate or used as any other component so as to provide a thin display device, and furthermore, can effectively prevent the glare phenomenon of the display device, and can more improve the durability and lifespan thereof.

8 Claims, No Drawings

(56) References Cited

U.S. PATENT DOCUMENTS

| | | |
|---|---|---|
| 2013/0194211 A1 | 8/2013 | Shinohara et al. |
| 2013/0250414 A1 | 9/2013 | Eguchi et al. |
| 2014/0340755 A1 | 11/2014 | Eguchi et al. |
| 2015/0036298 A1 | 2/2015 | Kim et al. |
| 2016/0146978 A1 | 5/2016 | Lee et al. |

FOREIGN PATENT DOCUMENTS

| | | |
|---|---|---|
| JP | 2006-63147 A | 3/2006 |
| JP | 2006063147 A | 3/2006 |
| JP | 2006-235198 A | 9/2006 |
| JP | 2006-522861 A | 10/2006 |
| JP | 2009-86360 A | 4/2009 |
| JP | 2010-519398 A | 6/2010 |
| JP | 2011084672 A | 4/2011 |
| JP | 2012194502 A | 10/2012 |
| JP | 2013228741 A | 11/2013 |
| JP | 2014016602 A | 1/2014 |
| JP | 2014-026122 A | 2/2014 |
| JP | 2014-059334 A | 4/2014 |
| JP | 2014065887 A | 4/2014 |
| JP | 2014-149504 A | 8/2014 |
| JP | 2015028578 A | 2/2015 |
| KR | 20100083047 A | 4/2010 |
| KR | 10-2013-0074665 A | 7/2013 |
| KR | 10-1337005 B1 | 12/2013 |
| KR | 10-2014-0076787 A | 6/2014 |
| KR | 10-2014-0140139 A | 12/2014 |
| KR | 10-2014-0140770 A | 12/2014 |
| KR | 20140140139 A * | 12/2014 |
| KR | 10-2015-0015314 A | 2/2015 |
| WO | 2012/053632 A1 | 4/2012 |
| WO | 2013/099931 A1 | 7/2013 |
| WO | 2014204273 A1 | 12/2014 |
| WO | 2014203894 A1 | 2/2017 |

OTHER PUBLICATIONS

Database WPI, 2017 Clarivate Analytics, Thompson Scientific, London, GB; AN 2014-W35826, XP002784102 Corresponding KR 10-2014-0140139 A, published Dec. 9, 2014).

Tajima, Seitarou, Silsesquioxane derivative 'SQ series' Toa synthesis research yearbook, TREND p. 37-41, No. 7, 2004, with English Summary, 6 pages.

* cited by examiner

ANTIREFLECTION FILM

CROSS-REFERENCE TO RELATED APPLICATION(S)

This application a Continuation Application of U.S. patent application Ser. No. 15/747,368 filed on Jan. 24, 2018, which is a 35 U.S.C. 371 National Phase Entry Application from PCT/KR2016/015340 filed on Dec. 27, 2016, which claims priority to and the benefit of Korean Patent Application No. 10-2016-0002242 filed on Jan. 7, 2016 with the Korean Intellectual Property Office, the entire contents of which are incorporated herein by reference.

TECHNICAL FIELD

The present invention relates to an antireflection film.

BACKGROUND OF THE INVENTION

In general, a flat panel display device such as a PDP or a LCD is equipped with an antireflection film for minimizing reflection of light incident from the outside.

As methods for minimizing the reflection of light, a method (anti-glare: AG coating) in which a filler such as an inorganic fine particle is dispersed in a resin and coated onto a base film to impart irregularities; a method (anti-reflection: AR coating) of using the interference of light by forming a plurality of layers having different refractive indexes on a base film; a method for mixing them; etc., exist.

Among them, in the case of the AG coating, the absolute amount of reflected light is equivalent to that of a general hard coating, but a low reflection effect can be obtained by reducing the amount of light entering the eye using light scattering through irregularities. However, since the AG coating has poor screen sharpness due to the surface irregularities, many studies on AR coating have recently been conducted.

On the other hand, a cellulose film is mainly used as a protective film of a polarizing plate which is essentially provided in a display device. However, the cellulose film is expensive, and with the recent tendency of a thin design for the display device, when produced with a thin thickness, the mechanical strength and permeability become poor, which causes problems such as the occurrence of light leakage phenomenon. In addition, polyester films are inexpensive and are known to exhibit excellent mechanical strength and water resistance even when produced with a thin thickness, but they have birefringence property, and thus, when used as a polarizing plate protective film, they cause a problem that image quality is deteriorated due to optical distortion.

DISCLOSURE

Technical Problem

It is one object of the present invention to provide an antireflection film including a low refractive index layer capable of remarkably improving a glare phenomenon resulting from reflection of light incident on the outside, and a base film having a birefringence property but not generating interference fringes due to optical distortion.

Technical Solution

The antireflection film or the like according to specific embodiments of the present invention will be described in more detail below.

In one embodiment of the present invention, an antireflection film is provided, including: a polyester film having an in-plane retardation value (Rin) of 3,000 nm to 30,000 nm in which a ratio (Rin/Rth) of an in-plane retardation value (Rin) to an thickness-direction retardation value (Rth) is 0.2 to 1.2; and a low refractive index layer which is disposed on the polyester film and which is a crosslinked polymer comprising a photopolymerizable compound, an inorganic particle, and a polysilsesquioxane in which at least one reactive functional group is substituted.

As an existing polarizing plate protective film, a cellulose film has been mainly used. However, the cellulose film is expensive, and with the recent tendency of a thin design for the display device, when produced with a thin thickness, the mechanical strength and water resistance become poor, which causes problems such as the occurrence of a light leakage phenomenon. Meanwhile, polyester films are inexpensive and have an advantage of exhibiting excellent mechanical strength and water resistance even when produced with a thin thickness, but they have a birefringence property, and thus, when used as a polarizing plate protective film, they cause a problem that image quality is deteriorated due to optical distortion.

Thus, the antireflection film according to one embodiment of the present invention includes a polyester film as a base film, and particularly includes a polyester film of which a retardation value is adjusted to a specific range, thereby effectively suppressing the occurrence of interference fringes and the like.

Specifically, the in-plane retardation value (Rin) of the polyester film may be adjusted to be within the range of 3,000 nm to 30,000 nm. More specifically, the lower limit of the in-plane retardation value (Rin) may be adjusted to be 4500 nm or more, 5,000 nm or more, 6,000 nm or more, or 7,000 nm or more, and the upper limit may be adjusted to be 30,000 nm or less. Within these ranges, the antireflection film can effectively suppress the occurrence of interference fringes, and it is formed with an appropriate thickness, thereby ensuring ease of handling, and further providing a thin polarizing plate and/or display device.

The in-plane retardation value (Rin) is a value calculated by measuring the biaxial refractive indexes (nx, ny) orthogonal to each other in the polyester film plane and the thickness (d) of the polyester film, and substituting the measured values into |nx−ny|*d. The refractive index and the thickness of the polyester film can be measured by various methods known in the technical field to which the present invention belongs, and for details of the measurement method, reference may be made to the methods described in test examples described later. The in-plane retardation value (Rin) can also be confirmed through a commercially available automatic birefringence measuring apparatus.

In addition, the polyester film has a ratio (Rin/Rth) of the in-plane retardation value (Rin) to the thickness-direction retardation value (Rth) in the range of 0.2 to 1.2 in order to prevent the occurrence of interference fringes while maintaining sufficient mechanical strength and water resistance. As the ratio (Rin/Rth) of the in-plane retardation value (Rin) to the thickness-direction retardation value (Rth) is larger, the isotropy of the polyester film is increased and thus the occurrence of interference fringes can be remarkably improved. However, in the case of a complete uniaxial film in which the ratio (Rin/Rth) of the in-plane retardation value (Rin) to the thickness-direction retardation value (Rth) is 2.0, there is a problem that the mechanical strength in the direction orthogonal to the direction of the orientation is lowered. Thus, it is possible to prevent the occurrence of interference fringes while maintaining sufficient mechanical strength and water resistance by adjusting the ratio (Rin/Rth) of the in-plane retardation value (Rin) to the thickness-direction retardation value (Rth) within the above-mentioned range.

The thickness-direction retardation value (Rth) is a value calculated by measuring the biaxial refractive indexes (nx, ny) orthogonal to each other in the polyester film plane, the refractive index (nz) in the thickness direction, and the thickness (d) of the polyester film, and substituting the measured values into [(nx+ny)/2−nz]d. The refractive index and the thickness of the polyester film can be measured by various methods known in the technical field to which the present invention belongs, and for details of the measurement method, reference may be made to the methods described in test examples described later. The thickness-direction retardation value (Rth) can also be confirmed through a commercially available automatic birefringence measuring apparatus.

The polyester film having the retardation value as described above can be obtained by stretch-processing various polyester resins which are known to have excellent transparency and thermal and mechanical properties in the technical field to which the present invention belongs. Specifically, a polyester resin such as polyethylene terephthalate or polyethylene naphthalate can be subjected to stretch processing under appropriate conditions to produce a polyester film exhibiting the above-mentioned properties. The polyester film may be provided either as a uniaxially stretched film or as a biaxially stretched film. The uniaxially stretched film is advantageous from the viewpoint of preventing the occurrence of interference fringes, but the uniaxially stretched film has a problem that the mechanical strength in a direction orthogonal to the direction of the orientation is poor. Therefore, it is advantageous for the polyester film to be provided as a biaxially stretched film. Such a biaxially stretched film can be provided by stretching various known polyester resins to a range of 1.0 to 3.5 times the longitudinal stretching magnification and a range of 2.5 to 6.0 times the transverse stretching magnification at a temperature of 80 to 130° C.

The thickness of the polyester film having the specific retardation value can be suitably adjusted within the range of 15 to 300 µm. Within these ranges, the antireflection film can be handled with ease while exhibiting sufficient mechanical strength and water resistance, and can further provide a thin polarizing plate and/or display device.

A low refractive index layer which is a crosslinked polymer of a photocurable coating composition including a photopolymerizable compound, an inorganic particle, and a polysilsesquioxane in which at least one reactive functional group is substituted is present on the polyester film having the specific retardation value. As used herein, the term "low refractive index layer" may refer to a layer having a low refractive index, for example, a layer exhibiting a refractive index of about 1.2 to 1.6. Hereinafter, the photocurable coating composition and the method of forming the low refractive index layer through the photocurable coating composition will be described in detail.

The photocurable coating composition may include a monomer or an oligomer containing a (meth)acryloyl group or a vinyl group as a photopolymerizable compound. The monomer or oligomer may include one or more, two or more, or three or more of (meth)acryloyl groups or vinyl groups. In the present specification, the (meth)acryl refers to including both acryl and methacryl.

Specific examples of the monomer or oligomer containing a (meth)acryloyl group include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trimethylolpropane tri(meth)acrylate, trimethylolpropane polyethoxy tri(meth)acrylate, ethylene glycol di(meth)acrylate, butanediol di(meth)acrylate, ethylhexyl (meth)acrylate, butyl (meth)acrylate, or a mixture of two or more thereof, or a urethane-modified acrylate oligomer, epoxide acrylate oligomer, ether acrylate oligomer, dendritic acrylate oligomer, or a mixture of two or more thereof.

Specific examples of the monomer or oligomer containing a vinyl group may include oligomers or the like obtained by polymerizing divinylbenzene, styrene, para-methyl styrene, or more than one type thereof. The molecular weight of the oligomer may be adjusted to be 1,000 to 10,000 g/mol.

The content of the photopolymerizable compound in the photocurable coating composition is not particularly limited, but may be adjusted to be 10% by weight to 80% by weight with respect to the solid content of the photocurable coating composition in consideration of the mechanical properties and the like of the finally produced low refractive index layer. The solid content of the photocurable coating composition means only a solid component, excluding a liquid component in the photocurable coating composition, for example, a component such as an organic solvent which may be optionally included as described below.

Since the photocurable coating composition includes a polysilsesquioxane in which at least one reactive functional group is substituted, it is possible to provide a low refractive index layer capable of realizing low reflectivity and high light transmittance, and simultaneously ensuring excellent wear resistance and scratch resistance while improving alkali resistance.

Such polysilsesquioxane in which at least one reactive functional group is substituted may contained in an amount of 0.5 to 30 parts by weight, 1 to 30 parts by weight, or 2 to 27 parts by weight based on 100 parts by weight of the photopolymerizable compound.

When the content of the polysilsesquioxane in which at least one reactive functional group is substituted is lower than the above-mentioned range, it may be difficult to ensure sufficient alkali resistance and scratch resistance of the coating film or the polymer resin formed during photocuring of the photocurable coating composition. In contrast, when the content of the polysilsesquioxane in which at least one reactive functional group is substituted is higher than the above-mentioned range, the transparency of the low refractive index layer produced from the photocurable coating composition may be decreased, and the scratch resistance may rather be decreased.

The reactive functional group that can be substituted in the polysilsesquioxane may include at least one functional group selected from the group consisting of alcohols, amines, carboxylic acids, epoxides, imides, (meth)acrylates, nitriles, norbornenes, olefins [ally, cycloalkenyl, vinyldimethylsilyl, etc.], polyethylene glycol, thiols, and vinyls, and may preferably be an epoxide or (meth)acrylate.

More specifically, when the reactive functional group is an epoxide, a 2-[3,4-epoxycyclohexyl]ethyl group or a 3-glycidoxypropyl group may be introduced as a reactive functional group, and when the reactive functional group is a (meth)acrylate, a (meth)acryloyloxyalkyl group (in which the alkyl group may have 1 to 6 carbon atoms) may be introduced as a reactive functional group.

Even if polysilsesquioxane employs the same functional group as the photopolymerizable compound as a reactive functional group, polysilsesquioxane having a skeleton of a siloxane bond (—Si—O—) is defined as not being included in the photopolymerizable compound.

Meanwhile, the polysilsesquioxane in which at least one reactive functional group is substituted may be additionally substituted with at least one non-reactive functional group selected from the group consisting of a linear or branched alkyl group having 1 to 20 carbon atoms, a cyclohexyl group having 6 to 20 carbon atoms, and an aryl group having 6 to 20 carbon atoms, in addition to the above-mentioned reactive functional group. As the surface of the polysilsesquioxane is substituted with a reactive functional group and an non-reactive functional group as described above, the siloxane bond (—Si—O—) in the polysilsesquioxane in which at least one reactive functional group is substituted is not exposed to the outside while being located inside the molecule, thereby further enhancing the alkali resistance of the coating film or the polymer resin formed during photocuring of the photocurable coating composition.

The polysilsesquioxane may be represented by $(RSiO_{1.5})_n$ (where n is 4 to 30 or 8 to 20, and R is a linear or branched alkyl group having 1 to 20 carbon atoms, a cycloalkyl group having 6 to 20 carbon atoms, or an aryl group having 6 to 20 carbon atoms), and may have various structures such as random, ladder-type, cage-type, partial cage-type, etc.

Among them, in order to further enhance the above-mentioned properties, a polyhedral oligomeric silsesquioxane having a cage structure, in which at least one reactive functional group is substituted, may be used as the polysilsesquioxane in which at least one reactive group is substituted.

More specifically, the polyhedral oligomeric silsesquioxane may include 8 to 20 silicon atoms in a molecule.

Further, the reactive functional groups may be introduced into at least one of the silicon atoms of the polyhedral oligomeric silsesquioxane, and the silicon atoms in which no reactive functional groups are introduced may be substituted with the non-reactive functional groups described above.

When the reactive functional groups are introduced into at least one of the silicon atoms of the polyhedral oligomeric silsesquioxane, the mechanical properties of the coating film or the polymer resin formed during photocuring of the photocurable coating composition may be greatly enhanced. Further, when a nonreactive functional group is introduced into the remaining silicon atoms, steric hindrance appears in the molecular structure and the probability of exposure of the siloxane bond (—Si O—) to the outside can be greatly lowered. Consequently, it is possible to greatly improve the alkali resistance of the coating film and the polymer resin formed during photocuring of the photocurable coating composition.

Examples of the polyhedral oligomeric silsesquioxane (POSS) having a cage structure in which at least one reactive functional group is substituted include POSS in which at least one alcohol is substituted, such as TMP diolisobutyl POSS, cyclohexanediol isobutyl POSS, 1,2-propanediolisobutyl POSS, octa(3-hydroxy-3 methylbutyldimethylsiloxy) POSS, etc.; POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS in which at least one carboxylic acid is substituted, such as maleamic acid-cyclohexyl POSS, maleamic acid-isobutyl POSS, octamaleamic acid POSS, etc; POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; POSS in which at least one imide is substituted, such as POSS maleimide cyclohexyl, POSS maleimide isobutyl, etc.; POSS in which at least one (meth)acrylate is substituted, such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acrylisooctyl POSS, (meth)acrylphenyl POSS, (meth)acryl POSS, acrylo POSS, etc.; POSS in which at least one nitrile group is substituted, such as cyanopropylisobutyl POSS, etc.; POSS in which at least one norbornene group is substituted, such as norbornenylethylethyl POSS, norbornenylethylisobutyl POSS, norbornenylethyl disilanoisobutyl POSS, trisnorbornenyl isobutyl POSS, etc.; POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; POSS in which at least one olefin is substituted, such as allylisobutyl POSS, monovinylisobutyl POSS, octacyclohexenyldimethylsilyl POSS, octavinyldimethylsilyl POSS, octavinyl POSS, etc.; POSS in which PEG having 5 to 30 carbon atoms is substituted; or POSS in which at least one thiol group is substituted, such as mercaptopropylisobutyl POSS, mercaptopropylisooctyl POSS, etc.

On the other hand, the photocurable coating composition may further include a fluorine-based compound containing a photoreactive functional group. In the present specification, a fluorine-based compound containing a photoreactive functional group means a compound having a weight average molecular weight of 2,000 g/mol or more and substituted with fluorine, and such a compound is defined as not being included in the definition of the photopolymerizable compound described above.

As the fluorine-based compound containing the photoreactive functional group is included, the low refractive index layer produced from the photocurable coating composition includes a polymer resin containing a crosslinked polymer between a photopolymerizable compound, a polysilsesquioxane in which at least one reactive functional group is substituted, and a fluorine-containing compound containing a photoreactive functional group, and an inorganic particle dispersed therein. An antireflection film including such a low refractive index layer can have lower reflectivity and improved light transmittance, and can further exhibit more improved alkali resistance and scratch resistance.

At least one photoreactive functional group is introduced into the fluorine-based compound, and the photoreactive functional group refers to a functional group which can participate in a polymerization reaction by irradiation of light, for example, by irradiation of visible light or ultraviolet light. The photoreactive functional group may include various functional groups known to be able to participate in a polymerization reaction by irradiation of light. Specific examples thereof include a (meth)acrylate group, an epoxy group, a vinyl group, a mercapto group, or the like. The at least one photoreactive functional group may be composed of any one of the functional groups listed or at least two selected from the functional groups listed.

The fluorine-based compound containing the photoreactive functional group may have a fluorine content of 1% by weight to 25% by weight. When the content of fluorine in the fluorine-based compound containing the photoreactive functional group is lower than the above-mentioned range, the fluorine component cannot be sufficiently arranged on the surface of the final product obtained from the photocurable coating composition, and thus it may be difficult to sufficiently secure the physical properties such as alkali resistance. Further, when the content of fluorine in the fluorine-based compound containing the photoreactive functional group is higher than the above-mentioned range, the surface properties of the final product obtained from the photocurable coating composition may be decreased, or the incidence rate of defective products may be increased in the subsequent process for obtaining the final product.

On the other hand, the fluorine-based compound containing a photoreactive functional group may further contain silicon, or a side chain or a repeating unit derived from a silicon compound. When the fluorine-based compound contains silicon, or a side chain or a repeating unit derived from a silicon compound, the content of silicon can be 0.1% by weight to 20% by weight based on the fluorine-based compound. The silicon contained in the fluorine-based compound containing the photoreactive functional group has a role of preventing the occurrence of haze in the low refractive index layer obtained from the photocurable coating composition of the embodiment, thereby serving to enhance transparency. On the other hand, when the content of silicon in the fluorine-based compound containing the photoreactive functional group exceeds the above-mentioned range, the alkali resistance of the low refractive layer obtained from the photocurable coating composition can be lowered.

The fluorine-based compound containing the photoreactive functional group may have a weight average molecular weight of 2,000 to 200,000 g/mol. If the weight average molecular weight of the fluorine-based compound containing the photoreactive functional group is too small, the low refractive index layer obtained from the photocurable coating composition may not have sufficient alkali resistance. Further, if the weight average molecular weight of the fluorine-based compound containing the photoreactive functional group is too large, the low refractive index layer obtained from the photocurable coating composition may not have sufficient durability and scratch resistance. In the present specification, the weight average molecular weight refers to a converted value with respect to standard polystyrene, as measured by gel permeation chromatography (GPC).

Specifically, the fluorine-based compound containing the photoreactive functional group may be: i) an aliphatic compound or an aliphatic cyclic compound in which at least one photoreactive functional group is substituted and at least one hydrogen is substituted with fluorine; ii) a silicone-based compound in which at least one carbon of the aliphatic compound or aliphatic cyclic compound is substituted with silicon; iii) a siloxane-based compound in which at least one carbon of the aliphatic compound or aliphatic cyclic compound is substituted with silicon and at least one —$CH_2$— is substituted with oxygen; iv) a fluoropolyether in which at least one —$CH_2$— of the aliphatic compound or aliphatic cyclic compound is substituted with oxygen; or a mixture or copolymer of two or more thereof.

The photocurable coating composition may include 1 to 75 parts by weight of the fluorine-based compound containing the photoreactive functional group based on 100 parts by weight of the photopolymerizable compound. When the fluorine-based compound containing the photoreactive functional group is added in an excess amount relative to the photopolymerizable compound, the coating properties of the photocurable coating composition may be reduced, or the low refractive index layer obtained from the photocurable coating composition may not have sufficient durability or scratch resistance. Further, when the amount of the fluorine-based compound containing the photoreactive functional group is too small relative to the photopolymerizable compound, the low refractive index layer obtained from the photocurable coating composition may not have sufficient alkali resistance.

On the other hand, the photocurable coating composition includes an inorganic particle having a diameter of nanometer or micrometer units.

Specifically, the inorganic fine particle may include a hollow silica particle having a number average particle diameter of 10 nm to 100 nm. The hollow silica particle refers to a silica particle derived from a silicon compound or an organosilicon compound, in which voids are present on the surface and/or inside of the silica particle. The hollow silica particle has a low refractive index compared to the particle filled inside, thereby exhibiting an excellent antiglare property.

The hollow silica particles may be those having a number average particle diameter of 10 nm to 100 nm, 20 nm to 70 nm, or 30 nm to 70 nm, and the shape of the particles is preferably spherical, but they may be amorphous.

In addition, the hollow silica nanoparticles include hollow silica nanoparticles of which the surface is coated with a photoreactive functional group, hollow silica particles of which the surface is coated with a fluorine-containing compound, and hollow silica particles of which the surface is not treated (hollow silica particles of which the surface is not substituted with a photoreactive functional group and of which the surface is not coated with the fluorine-containing compound), and these particles can be used alone, or in combination of two or more. Alternatively, a reaction product obtained by reacting two or more particles can be used. The photoreactive functional group may be a (meth)acrylate group, a vinyl group, a hydroxy group, an amine group, an allyl group, an epoxide group, a hydroxy group, an isocyanate group, an amine group, and a thiol group. When the surface of the hollow silica nanoparticles is coated with a fluorine-based compound, the surface energy may be further reduced. Thus, the hollow inorganic nanoparticles may be more uniformly distributed in the photocurable coating composition. Consequently, the film obtained from the photocurable coating composition containing the hollow silica nanoparticles can exhibit more improved durability and scratch resistance.

As a method of coating the fluorine-based compound onto the surface of the hollow inorganic nanoparticles, a conventionally known particle coating method or polymerization method and the like may be used without particular limitation. As a non-limiting example, a method by which the fluorine-based compound may be bonded to the surface of the hollow inorganic nanoparticles via hydrolysis and a condensation reaction by subjecting the hollow silica nanoparticles and the fluorine-based compound to a sol-gel reaction in the presence of water and a catalyst and the like can be used.

The hollow silica particles may be contained in the composition as a colloidal phase dispersed in a predetermined dispersion medium. The colloidal phase including the hollow silica particles may include an organic solvent as a dispersion medium.

The solid content of the hollow silica nanoparticles in the colloidal phase of the hollow silica particles can be determined in consideration of the content range of the hollow silica nanoparticles in the photocurable coating composition, the viscosity of the photocurable coating composition, and the like. For example, the solid content of the hollow silica nanoparticles in the colloidal phase may be 5% by weight to 60% by weight.

Herein, examples of the organic solvent in the dispersion medium include alcohols such as methanol, isopropyl alcohol, ethylene glycol, butanol, and the like; ketones such as methyl ethyl ketone, methyl isobutyl ketone, and the like; aromatic hydrocarbons such as toluene, xylene, and the like; amides such as dimethylformamide, dimethylacetamide, N-methylpyrrolidone, and the like; esters such as ethyl acetate, butyl acetate, gamma-butyrolactone, and the like; ethers such as tetrahydrofuran, 1,4-dioxane, and the like; or a mixture thereof.

The photocurable coating composition may include 10 to 350 parts by weight of the hollow silica nanoparticles based on 100 parts by weight of the photopolymerizable compound. If the hollow silica nanoparticles are added in an excess amount, the scratch resistance and wear resistance of the coating film may be lowered due to reduction of the content of the polymer resin.

As the photopolymerization initiator, any compound known to be usable in a photocurable resin composition may be used without particular limitation. Specifically, a benzophenone-based compound, an acetophenone-based compound, a nonimidazole-based compound, a triazine-based compound, an oxime-based compound, or a mixture of two or more thereof may be used.

The photopolymerization initiator may be used in an amount of 1 to 100 parts by weight, 1 to 50 parts by weight, or 1 to 25 parts by weight based on 100 parts by weight of the photopolymerizable compound. If the amount of the photopolymerization initiator is too small, some of the photocurable coating composition can be uncured in the photocuring step to generate a residual material. If the amount of the photopolymerization initiator is too large, the unreacted initiator may remain as impurities or the cross-linking density may be lowered, and thus the mechanical properties of the resulting film may be deteriorated, or the reflectivity may be greatly increased.

Meanwhile, the photocurable coating composition may further include an inorganic solvent. Non-limiting examples of the organic solvent include ketones, alcohols, acetates, and ethers, or a mixture of two or more thereof. Specific examples of such organic solvent include ketones such as methyl ethyl ketone, methyl isobutyl ketone, acetylacetone, and isobutyl ketone; alcohols such as methanol, ethanol, n-propanol, iso-propanol, n-butanol, iso-butanol, and t-butanol; acetates such as ethyl acetate, iso-propyl acetate, and polyethylene glycol monomethyl ether acetate; ethers such as tetrahydrofuran and propylene glycol monomethyl ether; and a mixture of two or more thereof.

The organic solvent may be added at the time of mixing the respective components contained in the photocurable coating composition, or may be contained in the photocurable coating composition while the respective components are added in a state of being dispersed or mixed in the organic solvent. If the content of the organic solvent in the photocurable coating composition is too small, the flowability of the photocurable coating composition may be reduced, resulting in defects such as the occurrence of stripes in the finally produced film, or the like. Further, if the organic solvent is added in an excess amount, the solid content is lowered, and the physical properties and surface properties of the film may be deteriorated due to insufficient coating and film formation, and defects may occur during the drying and curing processes. Accordingly, the photocurable coating composition may include an organic solvent such that the concentration of the total solids of the components contained becomes 1% to 50% by weight, or 2% to 20% by weight.

Such photocurable coating composition can be coated and photocured according to methods known in the technical field to which the present invention pertains to provide the low refractive index layer described above.

First, the photocurable coating composition can be coated onto the polyester film having the specific retardation value described above. In this case, the photocurable coating composition can be coated directly onto the polyester film or can be coated on a separate layer previously formed on the polyester film. The separate layer can be a hard coat layer having various functions described later.

The photocurable coating composition can be coated using methods and apparatuses known in the technical field to which the present invention belongs, and for example, it can be coated through a bar coating method such as with a Meyer bar or the like, a gravure coating method, a 2-roll reverse coating method, a vacuum slot die coating method, a 2-roll coating method, or the like.

The low refractive index layer may have a thickness of 1 nm to 300 nm, or 50 nm to 200 nm. Accordingly, the thickness of the photocurable coating composition coated onto the polyester film can be adjusted to be about 1 nm to 300 nm, or 50 nm to 200 nm.

After coating the photocurable coating composition on the base as described above, the photocurable coating composition can be photocured by irradiation with ultraviolet light or visible light in the wavelength region of 200 nm to 400 nm. At this time, the exposure amount of the irradiated light can be adjusted to be in the range of 100 mJ/cm$^2$ to 4,000 mJ/cm$^2$, and the exposure time can be appropriately adjusted depending on the exposure apparatus used, the wavelength of the irradiated light, or the amount of exposure.

The photocuring step may be performed under a nitrogen atmosphere. Accordingly, nitrogen purging can be performed before the photocuring step or during the photocuring step.

The low refractive index layer prepared from the photocurable coating composition as described above may include a polymer resin including a crosslinked polymer between a photopolymerizable compound and a polysilsesquioxane in which at least one reactive functional group is substituted, and optionally a fluorine-based compound containing a photoreactive functional group, and an inorganic particle dispersed in the polymer resin.

Such a low refractive index layer has excellent optical properties such as reflectivity and color in the visible light region, and excellent mechanical properties such as scratch resistance. Accordingly, the low refractive index layer can be used in a display device to remarkably improve the glare phenomenon caused by light incident from the outside of the device without impairing the quality of the image, and to effectively protect the surface of the device from external impact or stimulation.

In addition, the low refractive index layer has characteristics that the above-mentioned change in physical properties is very small even when exposed to an alkali. Due to such high alkali resistance, the low refractive index layer does not require the step of adhering and desorbing the protective film, which is essentially performed for protecting the low refractive index layer during the usual production process of the display device, and thereby the production process of the display device can be simplified and the production cost can be lowered. In particular, the low refractive index layer is excellent in alkali resistance at a high temperature, and thus the production process of the display device can be performed in more severe conditions. Thus, it is expected that the production speed and productivity can be greatly improved without deteriorating the quality of the device.

On the other hand, in the antireflection film according to one embodiment, a hard coating layer may be interposed between the polyester film having a specific retardation value and the low refraction index layer. Such a hard coating layer can realize an antiglare function, a scratch prevention function, an antistatic function, or a combination of two or more of these functions.

As an example, the hard coating layer may include a binder resin containing a photocurable resin and a (co) polymer having a weight average molecular weight of 10,000 g/mol or more (hereinafter referred to as a high molecular weight (co)polymer), and an organic or inorganic fine particle dispersed in the binder resin. As used herein, the (co)polymer refers to including both a co-polymer and a homo-polymer.

The high molecular weight (co)polymer may include at least one polymer selected from the group consisting of cellulose-based polymers, acryl-based polymers, styrene-based polymers, epoxide-based polymers, nylon-based polymers, urethane-based polymers, and polyolefin-based polymers.

The photocurable resin contained in the hard coating layer may be a polymer of a photopolymerizable compound capable of causing a polymerization reaction when irradiated with light such as ultraviolet light, and may be one that is commonly used in the technical field to which the present invention belongs. Specifically, as the photopolymerizable compound, at least one selected from a reactive acrylate oligomer group consisting of a urethane acrylate oligomer, an epoxide acrylate oligomer, a polyester acrylate, and a polyether acrylate can be used; and a polyfunctional acrylate monomer group consisting of dipentaerythritol hexaacrylate, dipentaerythritol pentaacrylate, pentaerythritol tetraacrylate, pentaerythritol triacrylate, trimethylene propyl triacrylate, propoxylated glycerol triacrylate, ethoxylated trimethylpropane triacrylate, 1,6-hexanediol diacrylate, tripropylene glycol diacrylate, and ethylene glycol diacrylate can be used.

The organic or inorganic fine particles may have a particle diameter of 0.5 µm to 10 µm. The particle diameter of the organic or inorganic fine particles may be equal to or higher than 0.5 µm to express the surface irregularities and internal haze, and may be equal to or lower than 10 µm in terms of the haze or coating thickness. For example, when the particle size of the fine particles is excessively increased to exceed 10 µm, the coating thickness must be increased in order to complement the fine surface irregularities, and accordingly, the crack resistance of the film may be reduced, which may be problematic.

The organic or inorganic fine particles may be organic fine particles selected from the group consisting of an acryl-based resin, a styrene-based resin, an epoxy-based resin, a nylon resin, and a copolymer thereof, or may be inorganic fine particles selected from the group consisting of a silicon oxide, titanium dioxide, an indium oxide, a tin oxide, a zirconium oxide, and a zinc oxide.

The hard coating layer may contain 1 to 20 parts by weight or 5 to 15 parts by weight, preferably 6 to 10 parts by weight, of the organic or inorganic fine particles based on 100 parts by weight of the photocurable resin. When the organic or inorganic fine particles are contained in an amount of less than 1 part by weight based on 100 parts by weight of the photocurable resin, the haze value may not be appropriately implemented due to internal scattering. Further, when the amount of the organic or inorganic fine particles exceeds 20 parts by weight based on 100 parts by weight of the photopolymerizable resin, the viscosity of the coating composition is increased, which causes a problem that the coating property becomes poor.

Further, the refractive index of the organic or inorganic fine particles is different from the refractive index of a photocurable resin forming a matrix. An appropriate refractive index difference is determined according to the content of the particles, and it is preferable to have a refractive index difference of 0.01 to 0.08. When the refractive index difference between the fine particles and the photocurable resin is less than 0.01, it may be difficult to obtain an appropriate haze value. Also, when the refractive index difference between the fine particles and the photocurable resin exceeds 0.08, a desired level of the shape of surface irregularities cannot be obtained because a very small amount of particles must be used.

Meanwhile, the hard coating layer may further include inorganic nanoparticles having a diameter of 1 nm to 120 nm. A predetermined functional group or compound may be bonded to the surface of the inorganic nanoparticles.

As the inorganic nanoparticles are used, the shape of the surface irregularities of the hard coating layer can be smoothly adjusted and the mechanical properties of the coating layer can be improved. In this case, the content of the inorganic nanoparticles can be adjusted to be 10 parts by weight or less based on 100 parts by weight of the photocurable resin. Specific examples of the inorganic nanoparticles include a silicon oxide, alumina, titania, etc.

The hard coating layer may be formed from a hard coating composition including an organic or inorganic fine particle, a photopolymerizable compound, a photopolymerization initiator, and a high molecular weight (co)polymer.

The antireflection film including such a hard coating layer is excellent in antiglare effect.

Another example of the hard coating layer may include a hard coating layer including a binder resin containing a photocurable resin, and an antistatic agent dispersed in the binder resin.

The photocurable resin contained in the hard coating layer may be a polymer of a photopolymerizable compound capable of causing a polymerization reaction when irradiated with light such as ultraviolet light, and may be one that is commonly used in the technical field to which the present invention belongs. Specifically, as the photopolymerizable compound, a polyfunctional (meth)acrylate-based monomer or oligomer can be used. In this case, the number of (meth)acrylate-based functional groups is adjusted to 2 to 10, 2 to 8, or 2 to 7, thereby securing the desired physical properties of the hard coating layer. More specifically, the photocurable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, toluene diisocyanate, xylene diisocyanate, hexamethylene diisocyanate, trimethylolpropane tri(meth)acrylate, and trimethylolpropane polyethoxy tri(meth)acrylate.

The antistatic agent may be a quaternary ammonium salt compound, a conductive polymer, or a mixture thereof. Herein, the quaternary ammonium salt compound may be a compound having at least one quaternary ammonium salt group in the molecule, and a low molecule type or a high molecule type can be used without limitation. Further, as the conductive polymer, a low molecule type or a high molecule type can be used without limitation, and its type is not particularly limited as long as it is conventionally used in the technical field to which the present invention belongs.

The hard coating film including a binder resin of the photocurable resin, and an antistatic agent dispersed in the binder resin, may further include at least one compound selected from the group consisting of an alkoxysilane-based oligomer and a metal alkoxide-based oligomer.

The alkoxysilane-based compound may be one that is conventionally used in the relevant art, but preferably, it may be at least one compound selected from the group consisting of tetramethoxysilane, tetraethoxysilane, tetraisopropoxysilane, methyltrimethoxysilane, methyltriethoxysilane, methacryloxypropyltrimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water. The sol-gel reaction can be carried out by a method similar to the above-described method for preparing an alkoxysilane-based oligomer.

However, since the metal alkoxide-based compound can rapidly react with water, the sol-gel reaction can be performed by a method of diluting the metal alkoxide-based compound in an organic solvent and then slowly dripping water thereto. At this time, considering the reaction efficiency or the like, the molar ratio (based on metal oxide ions) of the metal alkoxide-based compound to water is preferably adjusted within the range of 3 to 170.

Herein, the metal alkoxide-based compound may be at least one compound selected from the group consisting of titanium tetra-isopropoxide, zirconium isopropoxide, and aluminum isopropoxide.

The hard coating composition for forming the hard coating layer capable of realizing the various functions may further include a photopolymerization initiator, a solvent, etc., which may be added to the photocurable coating composition for forming the low refractive index layer.

In one embodiment of the invention as described above, the low refractive index layer having excellent alkali resistance and exhibiting remarkably improved mechanical properties such as scratch resistance and impact resistance as well as a reduced glare phenomenon is formed on a base film exhibiting excellent mechanical strength and water resistance in spite of a thin thickness, thereby providing an antireflection film that satisfies various required properties evenly. Such an antireflection film can be used as a protective film of a polarizing plate or used as any other component so as to provide a thin display device, and furthermore, can effectively prevent the glare phenomenon of the display device, and can more improve the durability and lifespan thereof.

Advantageous Effects

The antireflection film according to one embodiment of the present invention includes a low refractive index layer having excellent alkali resistance and exhibiting remarkably improved mechanical properties such as scratch resistance and impact resistance as well as reduction of a glare phenomenon, and a base film exhibiting excellent mechanical strength and water resistance in spite of a thin thickness and having no fear of interference fringes occurring. Therefore, such antireflection film can be used as a protective film of a polarizing plate or used as any other component so as to provide a thin display device, and furthermore, can effectively prevent the glare phenomenon of the display device, and can more improve the durability and lifespan thereof.

DETAILED DESCRIPTION OF THE EMBODIMENTS

The action and effect of the invention will be described in more detail through concrete examples of the invention below. However, these examples are given for illustrative purposes only, and these examples are not intended to limit the scope of the invention in any way.

Examples 1-4 and Comparative Examples 1-4: Preparation of Antireflection Film

An antireflection film was prepared by the following method using the base film, the hard coating composition, and the photocurable coating composition listed in Table 1 below.

Specifically, the hard coating composition was coated onto a base film with a #10 Mayer bar, dried at 90° C. for 1 minute, and then irradiated with ultraviolet light at 150 mJ/cm$^2$ to form a hard coating layer having a thickness of 5 μm (antistatic hard coating layer or antiglare hard coating layer).

Then, the photocurable coating composition was coated onto the hard coat layer with a #3 Mayer bar and dried at 60° C. for 1 minute. Then, ultraviolet light at 180 mJ/cm$^2$ was irradiated to the dried material under a nitrogen purge to form a low refractive index layer having a thickness of 110 nm, thereby preparing an antireflection film.

TABLE 1

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Base film | TA015 (thickness: 80 μm) | A015 (thickness: 80 μm) | A015 (thickness: 80 μm) | A015 (thickness: 80 μm) | 4300 (thickness: 75 μm) | 4300 (thickness: 100 μm) | Z TAC (thickness: 60 μm) | TA015 (thickness: 80 μm) |
| ard coating composition | HD1 | HD2 | HD1 | HD2 | HD1 | HD1 | HD1 | HD1 |
| Photocurable coating composition | LR1 | LR1 | LR2 | LR2 | LR1 | LR1 | LR1 | LR3 |

The physical properties such as manufacturer, phase difference, and water vapor transmission rate of each base film in Table 1 are listed in Table 2 below. HD1 is a salt type of antistatic hard coating solution (manufactured by KYOEISHA Chemical, solid content: 50 wt %, product name: LJD-1000).

HD2 is an antiglare hard coating composition prepared by mixing 13 g of pentaerythritol triacrylate (molecular weight: 298 g/mol), 10 g of a urethane acrylate oligomer (306I, KYOEISHA Chemical), 10 g of a urethane acrylate oligomer (306T, KYOEISHA Chemical), 20 g of isopropyl alcohol as a solvent, 2 g of a photoinitiator (Irgacure 184, Ciba), and 0.5 g of a leveling agent (Tego glide 410) and then adding 2.3 g of an acryl-styrene copolymer (Techpolymer, Sekisui Plastic) which is spherical organic fine particles having an average particle diameter of 3 μm and a refractive index of 1.555, and 0.01 g of a nanosilica dispersion (MA-ST, Nissan Chemical) having a volume average particle diameter of 12 nm, to the resulting composition. Specific components and compositions of LR1, LR2, and LR3 are listed in Table 3 below. LR1, LR2, and LR3 were used by mixing the components described in Table 3 below with the compositions described herein and diluting in a solvent in which MIBK (methyl isobutyl ketone) and PGME (propylene glycol monomethyl ether) were mixed at a weight ratio of 1:1 so that the solid content concentration became 3 wt %.

TABLE 2

| Product name | TA015 (thickness: 80 μm) | 4300 (thickness: 75 μm) | 4300 (thickness: 100 μm) | Z TAC (thickness: 60 μm) |
|---|---|---|---|---|
| Manufacturer | TOYOBO | TOYOBO | TOYOBO | FUJI |
| Rin [nm] | 8400 | 2400 | 3200 | 3.3 |
| Rth [nm] | 9200 | 12750 | 17000 | 48.6 |
| Rin/Rth | 0.913 | 0.188 | 0.188 | 0.068 |
| Water vapor transmission rate [g/m²*day] | 6.38 | 6.93 | 5.1 | 275 |
| Permeability | 5.1 | 5.2 | 5.1 | 165 |

(1) The thickness of the base film was measured using ID-C112XBS (Mitutoyo).
(2) The in-plane retardation value (Rin = |nx − ny| * d) and the thickness-direction retardation value (Rth = [(nx + ny)/2 − nz]d) of the base film were measured using RETS-100 (OTSUKA ELECTRONICS). However, the retardation value of the triacetylcellulose film (UZ TAC, FUJI) was measured using AxoScan (Axometrics). Then, Rin/Rth was determined by dividing the in-plane retardation value (Rin) by the thickness-direction retardation value (Rth).
(3) The water vapor transmission rate (WVTS) of the base film was measured at a temperature of 40° C. and relative humidity of 90% using TSY-T3 (Labthink) which is a water vapor permeability tester. Since the water vapor transmission rate (WVTS) decreases as the thickness increases, the water vapor transmission rate per thickness of 100 μm is defined as permeability, and the permeability is determined by the formula of "thickness (unit: μm) * water vapor transmission rate/100" and shown in Table 2.

TABLE 3

|  | LR1 | LR2 | LR3 |
|---|---|---|---|
| Hollow silica dispersion[1] | 250 | 220 | 250 |
| Dipentaerythritol pentaacrylate | 37 | 39 | 40 |
| Polysilsesquioxane[2] | 3 | 3 | 0 |
| Fluorine-containing compound containing a photoreactive functional group[3] | 13.3 | 26.7 | 13.3 |
| Photoinitiator[4] | 6 | 6 | 6 |

(unit: g)
[1]Hollow silica dispersion: THRULYA 4320 (manufactured by Catalysts and Chemicals Ltd.) in which hollow silica particles having a number average diameter of 50 nm are dispersed to a solid content of 20% by weight in methyl isobutyl ketone.
[2]Polysilsesquioxane: MA0701 manufactured by Hybrid Plastics.
[3]Fluorine-based compound containing a photoreactive functional group: A fluorine compound containing a photoreactive functional group and containing a trace amount of silicon, and RS537 (manufactured by DIC) diluted to 30% by weight in methyl isobutyl ketone
[4]Photoinitiator: Irgacure-127 (manufactured by Ciba)

Experimental Examples: Measurement of Physical Properties of Antireflection Films 1. Measurement of Average Reflectivity The average reflectivity of the antireflection films obtained in the examples and comparative examples was measured using Solidspec 3700 (SHIMADZU) equipment.

Specifically, a black tape was attached to the surface of the base film on which no hard coating layer was formed so that light would not be transmitted. The measurement conditions were set as a sampling interval 1 nm, a time constant of 0.1 s, a slit width 20 nm, and a medium scanning speed. Light of a wavelength region of 380 nm to 780 nm was irradiated to the low refractive index layer of the antireflection film at room temperature.

When HD2 was used as the hard coating composition, a 100% T mode was applied, and when HD1 was used as the hard coating composition, a measure mode was applied. Thereby, the reflectance in the wavelength region of 380 nm to 780 nm was measured. The results are shown in Table 4 below.

2. Measurement of Scratch Resistance

The surfaces of the antireflection films obtained in the examples and comparative examples were rubbed while applying a load to a steel wool (#0000) and reciprocating ten times at a speed of 24 rpm. When observed with the naked eye under ceiling illumination by a 50 W LED while increasing the load applied to the steel wool, the maximum load at which scratches were not generated was measured. The above load is defined as weight (g) per area (2*2 cm²) of 2 cm in width and 2 cm in height.

3. Evaluation of Occurrence of Interference Fringes

A black PET film was attached to the surface of the base film on which the hard coating layer was not formed by using the antireflection film produced according to the examples and comparative examples, and it was evaluated with respect to whether interference fringes were observed with the naked eye. As a result of the evaluation, when no interference fringes were observed in the antireflection film, it was described as "good" in Table 4 below, and when interference fringes were clearly observed, it was described as "severe".

4. Evaluation of Water Vapor Transmission Rate and Permeability

The water vapor transmission rate (WVTS) of the antireflection films prepared according to the examples and comparative examples was measured at a temperature of 40° C. using TSY-T3 (Labthink), a water vapor permeability tester. At this time, the antireflection film was loaded so that the base film side of the antireflection film was placed under a relative humidity of 100%, and the low refractive index layer side was placed under a relative humidity of 10%. Since the water vapor transmission rate (WVTS) decreases as the thickness increases, the water vapor transmission rate per thickness of 100 μm is defined as permeability, and the permeability is determined by the formula "thickness (unit: μm)*water vapor transmission rate/100" and is shown in Table 4 below. Here, the thickness of the antireflection film was measured in the same manner as the method of measuring the thickness of the base film.

TABLE 4

|  | Example 1 | Example 2 | Example 3 | Example 4 | Comparative Example 1 | Comparative Example 2 | Comparative Example 3 | Comparative Example 4 |
|---|---|---|---|---|---|---|---|---|
| Average reflectivity | ~1.5% | ~1.5% | ~1.5% | ~1.5% | ~1.5% | ~1.5% | ~1.5% | ~1.5% |
| Scratch resistance [g/(2 * 2 cm$^2$)] | 300 | 300 | 300 | 300 | 300 | 300 | 300 | 100 |
| Interference fringes | Good | Good | Good | Good | Severe | Severe | Good | Good |
| Water vapor transmission rate [g/m$^2$ * day] | 10.18 | 9.79 | 10.20 | 9.56 | 11.01 | 8.54 | 222.77 | 10.82 |
| Total thickness of film [μm] | 85.1 | 85.1 | 85.1 | 85.1 | 80.1 | 105.1 | 65.1 | 85.1 |
| Permeability | 8.66 | 8.33 | 8.68 | 8.14 | 8.82 | 8.98 | 145.02 | 9.21 |

Referring to Table 4, it was confirmed that the antireflection film according to one embodiment of the present invention exhibited excellent water resistance while showing an excellent low reflective index and scratch resistance, and hardly any interference fringe was found. In contrast, when an optically anisotropic base film of which the phase difference was not adjusted to a specific range was used as in Comparative Examples 1 and 2, it was confirmed that interference fringes were severely generated, thereby being unsuitable for the antireflection film of the display. Moreover, when an existing cellulose base film was used as in Comparative Example 3, it was confirmed that the permeability was poor and there was a fear of shortening the lifespan of the display. In addition, even if an optically anisotropic base film of which the phase difference was adjusted to a specific range was used as the base film as in Comparative Example 3, it was confirmed that, when the low refractive index layer according to one embodiment of the present invention was not included, excellent scratch resistance could not be ensured.

The invention claimed is:

1. An antireflection film comprising:
    a polyester film having an in-plane retardation value (Rin) of 3000 nm to 30,000 nm in which a ratio (Rin/Rth) of the in-plane retardation value (Rin) to a thickness-direction retardation value (Rth) is 0.2 to 1.2;
    a low refractive index layer which is disposed on the polyester film and which comprises a crosslinked polymer of a photocurable coating composition comprising
    a photopolymerizable compound comprising a monomer or oligomer containing a (meth)acryloyl group,
    a fluorine-based compound containing a photoreactive functional group,
    an inorganic particle, and
    a polyhedral oligomeric polysilsesquioxane (POSS) having a cage structure in which at least one reactive functional group is substituted; and
    a hard coating layer between the polyester film and the low refraction index layer,
    wherein the photocurable coating composition contains the POSS having a cage structure in which at least one reactive functional group is substituted, in an amount of 2 to 27 parts by weight based on 100 parts by weight of the photopolymerizable compound, and
    wherein the photopolymerizable compound is included in an amount of 13 wt % to 80 wt % with respect to the solid content of the photocurable coating composition, wherein the fluorine-based compound containing a photoreactive function group is not included in the photopolymerizable compound, and
    wherein the photocurable coating composition includes 1 to 75 parts by weight of the fluorine-based compound containing the photoreactive functional group based on 100 parts by weight of the photopolymerizable compound.

2. The antireflection film of claim 1,
    wherein the polyester film is a uniaxially stretched film or a biaxially stretched film of polyethylene terephthalate or polyethylene naphthalate.

3. The antireflection film of claim 1,
    wherein the reactive functional group substituted in the POSS comprises at least one functional group selected from the group consisting of an alcohol, an amine, a carboxylic acid, an epoxide, an imide, a (meth)acrylate, a nitrile, a norbornene, an olefin, a polyethylene glycol, a thiol, and a vinyl group.

4. The antireflection film of claim 1,
    wherein the photoreactive functional group of the fluorine-based compound is at least one functional group selected from the group consisting of a (meth)acryloyl group, an epoxy group, a vinyl group, and a mercapto group.

5. The antireflection film of claim 1,
    wherein the fluorine-based compound containing the photoreactive functional group has a weight average molecular weight of 2,000 to 200,000 g/mol.

6. The antireflection film of claim 1,
    wherein the inorganic particle includes a hollow silica particle having a number average particle diameter of 10 nm to 100 nm.

7. The antireflection film of claim 6,
    wherein the photocurable coating composition includes 10 to 350 parts by weight of the hollow silica nanoparticle based on 100 parts by weight of the photopolymerizable compound.

8. The antireflection film of claim 1,
    wherein the hard coating layer is provided with a function selected from the group consisting of an antiglare function, a scratch prevention function, an antistatic function, and any combination thereof.

* * * * *